(12) United States Patent
Hower et al.

(10) Patent No.: US 9,361,118 B2
(45) Date of Patent: Jun. 7, 2016

(54) METHOD FOR MEMORY CONSISTENCY AMONG HETEROGENEOUS COMPUTER COMPONENTS

(71) Applicant: Advanced Micro Devices, Inc., Sunnyvale, CA (US)

(72) Inventors: Derek R. Hower, Seattle, WA (US); Mark D. Hill, Madison, WI (US); David Wood, Madison, WI (US); Steven K. Reinhardt, Vancouver, WA (US); Benedict R. Gaster, Santa Cruz, CA (US); Blake A. Hechtman, Durham, NC (US); Bradford M. Beckmann, Redmond, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 96 days.

(21) Appl. No.: 14/275,271

(22) Filed: May 12, 2014

(65) Prior Publication Data
US 2014/0337587 A1    Nov. 13, 2014

Related U.S. Application Data

(60) Provisional application No. 61/822,753, filed on May 13, 2013.

(51) Int. Cl.
*G06F 12/00* (2006.01)
*G06F 9/44* (2006.01)
*G06F 9/52* (2006.01)

(52) U.S. Cl.
CPC .. *G06F 9/44* (2013.01); *G06F 9/52* (2013.01); *G06F 9/522* (2013.01); *G06F 9/524* (2013.01); *G06F 9/526* (2013.01)

(58) Field of Classification Search
CPC ............ G06F 9/52; G06F 9/522; G06F 9/524; G06F 9/526
See application file for complete search history.

(56) References Cited

U.S. PATENT DOCUMENTS

2008/0109807 A1*  5/2008  Rosenbluth ............. G06F 9/526
                                                                                              718/102

* cited by examiner

*Primary Examiner* — Shawn X Gu
(74) *Attorney, Agent, or Firm* — Volpe and Koenig, P.C.

(57) ABSTRACT

A method, computer program product, and system is described that determines the correctness of using memory operations in a computing device with heterogeneous computer components. Embodiments include an optimizer based on the characteristics of a Sequential Consistency for Heterogeneous-Race-Free (SC for HRF) model that analyzes a program and determines the correctness of the ordering of events in the program. HRF models include combinations of the properties: scope order, scope inclusion, and scope transitivity. The optimizer can determine when a program is heterogeneous-race-free in accordance with an SC for HRF memory consistency model. For example, the optimizer can analyze a portion of program code, respect the properties of the SC for HRF model, and determine whether a value produced by a store memory event will be a candidate for a value observed by a load memory event. In addition, the optimizer can determine whether reordering of events is possible.

20 Claims, 11 Drawing Sheets

Both defintions use the same concept of value order:
$$\vec{vo} = \{(s_i, l_j) \mid l_j \text{ receives the value of } s_i \text{ during an execution}\}$$

Strong Scope Order:

$\vec{io}$ = inferred order
$\vec{pof}$ = program order, fences only
$\vec{fo}$ = fence order $a_i$: Acquire a by thread i
$r_j$: Release r by thread j $$\vec{io} = \{(r_i, a_j) \mid \exists (l_j, s_i) : (r_i, s_i) \in \vec{po} \ \land \ (l_j, a_j) \in \vec{po} \ \land \ (s_i, l_j) \in \vec{vo}\}$$
$$\vec{pof} = \{(f_i, f_i') \mid f_i \text{ is a fence} \land f_i' \text{ is a fence} \land (f_i, f_i') \in \vec{po}\}$$
$$\vec{fo} = (\vec{io} \cup \vec{pof})^*$$

Weak Scope Order:

$\vec{io}$ = inferred order
$\vec{pof_s}$ = program order, fences only, from scope s
$\vec{fo}$ = fence order $S$: set of all scopes $$\vec{io} = \{(r_i, a_j) \mid \exists (l_j, s_i) : (r_i, s_i) \in \vec{po} \ \land \ (l_j, a_j) \in \vec{po} \ \land \ (s_i, l_j) \in \vec{vo} \ \land \ scope(r_i) = scope(a_j)\}$$
$$\vec{pof_s} = \{(f_i, f_i') \mid f_i \text{ is a fence} \land f_i' \text{ is a fence} \land (f_i, f_i') \in \vec{po} \ \land \ scope(f_i) = s \land scope(f_i') = s\}$$
$$\vec{fo} = \bigcup_{s \in S} (\vec{io} \cup \vec{pof_s})^*$$

FIG. 8

With Scope Inclusion:

$a_i$: Acquire a by thread i $r_j$: Release r by thread j $inclra = \{(r_i, a_j) \mid (scope(a_j) \subseteq scope(r_i)) \wedge (j \in scope(r_i))\}$ $inclar = \{(r_i, a_j) \mid (scope(r_i) \subseteq scope(a_j)) \wedge (i \in scope(a_j))\}$ $same = \{(r_i, a_j) \mid (scope(r_i) = scope(a_j))\}$ $candidates = same \cup inclra \cup inclar$ $\overline{so} = \{(r_i, a_j) \mid ((r_i, a_j) \in candidates) \wedge (r_j, a_i) \in \overline{fo}\}$

Without Scope Inclusion:

Same as above, but omit *inclra* and *inclar* from candidates

FIG. 9

With Scope Transivity:

$$\overline{hhb} = \left(\overline{po} \cup \overline{so}\right)^+$$

Without Scope Transivity:

$S$ : The set of all scopes $$\overline{so_s} = \left\{(a_i, r_j) \mid \left((a_i, r_j) \in \overline{so}\right) \wedge \left((scope(a_i) = s) \vee (scope(r_j) = s)\right)\right\}$$

$$\overline{hhb} = \bigcup_{s \ni A} \left(\overline{po} \cup \overline{so_s}\right)^+$$

FIG. 10

METHOD FOR MEMORY CONSISTENCY AMONG HETEROGENEOUS COMPUTER COMPONENTS

CROSS REFERENCE TO RELATED APPLICATIONS

This application claims benefit under 35 U.S.C. §119(e) to U.S. Provisional Patent Application No. 61/822,753, entitled "Method for Memory Consistency Among Heterogeneous Computer Components," to Hower et al., filed May 13, 2013, the entirety of which is hereby incorporated by reference as if fully set forth herein.

BACKGROUND

1. Field

The embodiments are generally directed to managing memory, and more specifically to managing memory among heterogeneous computer components.

2. Background Art

A computing device generally includes one or more processing units (e.g., a central processing unit (CPU), a graphics processing unit (GPU), a general purpose GPU (GPGPU), an accelerated processing unit (APU), or the like), that access a shared main memory. The processing units may execute programs (e.g., instructions or threads) that result in accesses to main memory. Because memory accesses may traverse a memory hierarchy including levels of cache and main memory, memory accesses may have different latencies, and may be performed in a different order than what was intended by the programs. In addition there may be conflicts, e.g., when two memory accesses attempt to store data in the same memory location.

Memory accesses, also called memory events, include such events as a store memory event (i.e., a memory access request to write data to main memory), a load memory event (i.e., a memory access request to read data from main memory), and synchronization events that are used to order memory events. Some synchronization events order memory events with respect to a subset of threads called a scope.

Memory consistency models provide rules for ordering memory events. However, existing memory consistency models for heterogeneous systems are not robustly defined, and because of the ambiguity, programmers are challenged to understand how a program will execute on a particular computing device, especially a computing device with heterogeneous computer components.

BRIEF DESCRIPTION OF THE DRAWINGS/FIGURE

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

FIG. 8 illustrates a set builder notation for a model with the properties of strong and weak scope order, according to an embodiment.

FIG. 9 illustrates a set builder notation for a model with and without scope inclusion, according to an embodiment.

FIG. 10. Illustrates a set builder notation for a model with and without scope transitivity, according to an embodiment.

Figure 11:
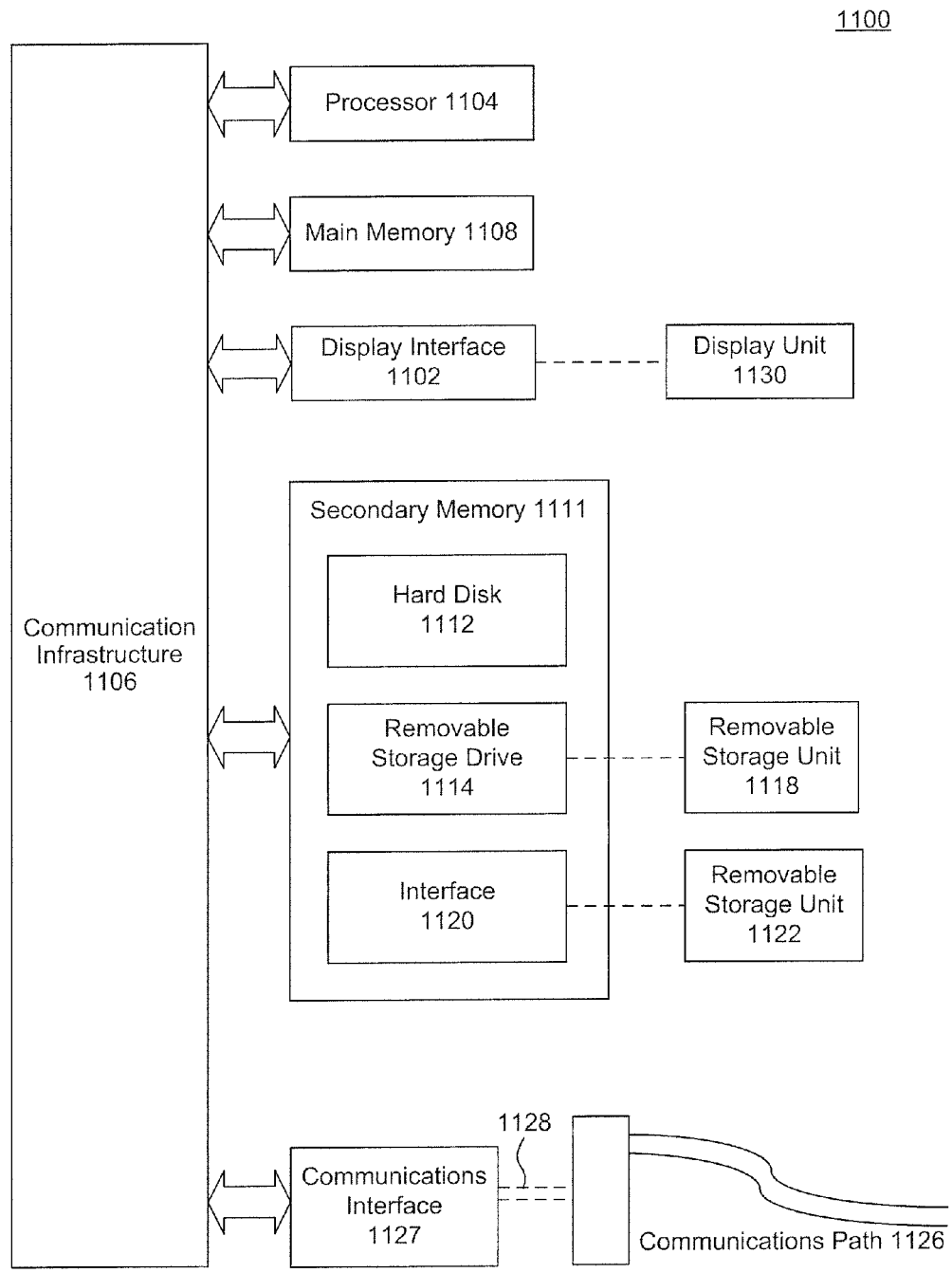

FIG. 11 illustrates an example computer system in which embodiments may be implemented, according to an embodiment.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

What is needed therefore, are embodiments that determine the correctness of using memory operations in a computing device with heterogeneous computer components. Sequential Consistency (SC) is a memory model in which all threads appear to be executed by a multi-tasking uniprocessor. SC for Heterogeneous-Race-Free (SC for HRF) is a memory model in which an execution appears to be sequentially consistent as long as a heterogeneous synchronization model is followed.

Embodiments include an optimizer based on the characteristics of a SC for HRF model. The optimizer (e.g., a compiler, a finalizer, a GPU, or a CPU) analyzes a program and determines among the set of all possible event orderings, which event orderings are valid under the guidelines of a given SC for HRF model. Multiple valid orderings may exist for a given program. SC for HRF models include combinations of the properties: scope order, scope inclusion, and scope transitivity. For example, the optimizer can examine a portion of program code, apply the properties of the SC for HRF model, and determine whether a value produced by a store memory event will be a candidate for a value observed by a load memory event. Using this knowledge, the optimizer can determine whether or not an event reordering that may improve performance or reduce energy is possible. Certain embodiments include a method, computer program product, and a system.

For example, a method includes receiving a portion of program code, the portion having a first thread and a second thread; identifying a store memory event associated with the first thread and a load memory event associated with the second thread, wherein the store memory event and the load memory share a same variable (e.g., a name for an address in memory); and determining, in accordance with a memory consistency model, when a program is heterogeneous-race-free due to a release synchronization event associated with the first thread and an acquire synchronization event associated with the second thread, the memory consistency model having a property of scope order, scope inclusion, scope transitivity or combination thereof.

Certain embodiments include a computer-readable storage device that includes stored instructions which are executed by a processing unit. In response to receiving a portion of program code, the portion having a first thread and a second thread, the processing unit performs operations including identifying a store memory event associated with the first thread and a load memory event associated with the second thread, where the store memory event and the load memory share a same variable. The operations further include determining, in accordance with a memory consistency model, a when a program is heterogeneous-race-free due to a release synchronization event associated with the first thread, and an acquire synchronization event associated with the second thread, the memory consistency model having a property of scope order, scope inclusion, scope transitivity or combination thereof.

A further embodiment includes a processing unit that includes one or more compute units configured to receive a portion of program code, the portion having a first thread and a second thread. The processing unit processes the portion to identify a store memory event associated with the first thread and a load memory event associated with the second thread, wherein the store memory event and the load memory share a same variable. In addition, the processing unit determines, in accordance with a memory consistency model, when a program is heterogeneous-race-free due to a release synchronization event associated with the first thread and an acquire synchronization event associated with the second thread, the memory consistency model having a property of scope order, scope inclusion, scope transitivity or combination thereof.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Computing devices process data and provide many applications to users. Example computing devices include, but are not limited to, mobile phones, personal computers, workstations, and game consoles. Computing devices use a central processing unit ("CPU") to process data. A CPU is a processor which carries out instructions of computer programs or applications. For example, a CPU carries out instructions by performing arithmetical, logical and input/output operations. In an embodiment, a CPU performs control instructions that include decision making code of a computer program or an application, and delegates processing to other processors in the electronic device, such as a graphics processing unit ("GPU").

A GPU is a processor that is a specialized electronic circuit designed to rapidly process mathematically intensive applications on electronic devices. The GPU has a highly parallel structure that is efficient for parallel processing of large blocks of data, such as mathematically intensive data common to computer graphics applications, images and videos. The GPU may receive data for processing from a CPU or generate data for processing from previously processed data and operations. In an embodiment, the GPU is a hardware-based processor that uses hardware to process data in parallel.

Due to advances in technology, a GPU also performs general purpose computing (also referred to as GPGPU computing). In GPGPU computing, a GPU performs computations that traditionally were handled by a CPU. An accelerated processing unit (APU) includes at least the functions of a CPU and a GPU. A GPU can be a GPGPU.

In an embodiment, a GPU includes one or more compute units (CUs) that process data. A compute unit (CU) includes arithmetic logic units (ALUs) and other resources that process data on the GPU. Data can be processed in parallel within and across compute units.

In an embodiment, a control processor on a GPU schedules task processing on compute units. Tasks include computation instructions. Those computation instructions may access data stored in the memory system of a computing device and manipulate the accessed data. In an embodiment, the data may be stored in volatile or non-volatile memory. An example of volatile memory includes random access memory (RAM). Examples of RAM include dynamic random access memory (DRAM) and static random access memory (SRAM). Volatile memory typically stores data as long as the electronic device receives power. Examples of non-volatile memory include read-only memory (ROM), flash memory, ferroelectric RAM (F-RAM), hard disks, floppy disks, magnetic tape, optical discs, etc. Non-volatile memory retains its memory state when the electronic device loses power or is turned off.

Computing devices with heterogeneous platforms may include an integrated, shared memory address space for such platforms. Because not all threads (e.g., a sequence of instructions) in a heterogeneous platform can communicate with the same latency, some instructions (e.g., memory events) may be performed in a different order than intended. Synchronization mechanisms are implemented to maintain order and avoid conflicting events, for example.

A memory fence is an operation used to delay a memory access until a set of previous memory accesses has been performed. Synchronization events utilize memory fences to enforce order by making results visible (i.e., available for reading) in a shared global memory or local cache so that events in the thread or in other threads in a scope in the computing device may utilize the results accordingly. A release synchronization event acts like an upward memory fence such that prior memory operations are visible to threads that share access to the shared global memory or shared local cache before the release synchronization event completes. An acquire synchronization event acts as downward memory fence such that later operations cannot occur before the acquire synchronization event completes.

Existing CPU memory models for homogenous systems, such as total store order (TSO), Sequential Consistency for Data-Race-Free (SC for DRF), and release consistency, are ill-suited for use in a heterogeneous computing system, in part, because synchronization events are ordered with respect to each other (i.e., the synchronization events are in total global order). In other words, store events complete to main or global memory, thereby precluding low-energy non-global coordination.

Figure 1:
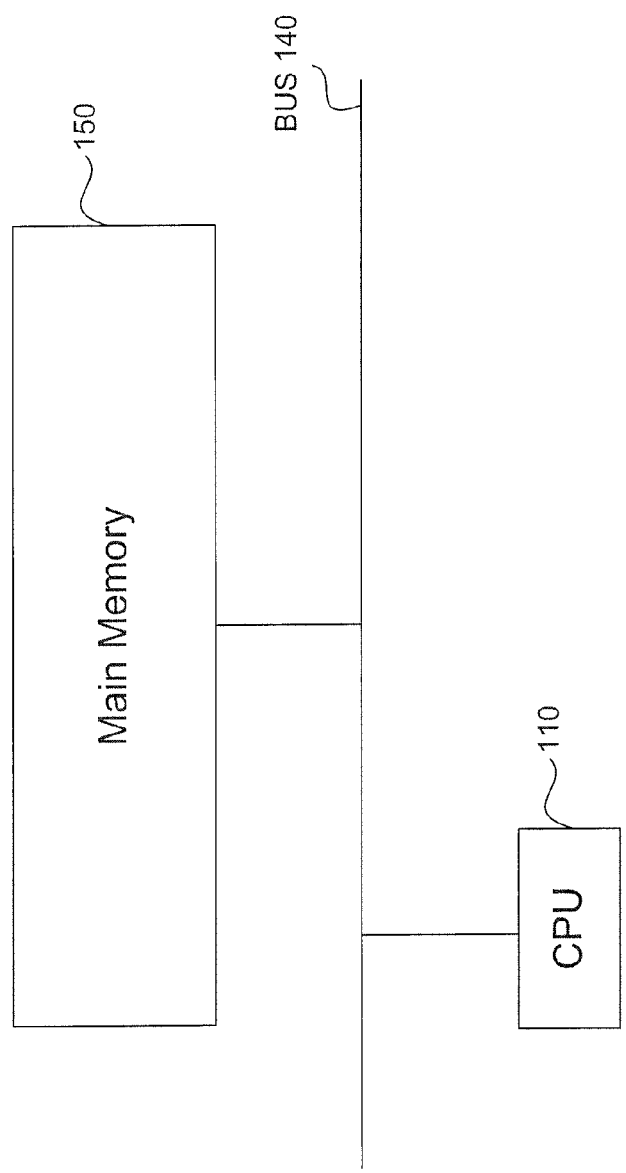
FIG. 1 illustrates a CPU computing system, according to an embodiment.

FIG. 1 illustrates a CPU computing system. In the example shown, system 100 is a homogenous computing environment that includes CPU 110, main memory 150, and bus 140. Bus 140 may be any type of communication infrastructure used in computer systems, including a peripheral component interface (PCI) bus, a memory bus, a PCI Express (PCIE) bus, front-side bus (FSB), hypertransport (HT), or another type of communication structure or communications channel whether presently available or developed in the future. CPU 110 executes portions of program code, or threads, that include operations or memory events such as writing or storing values to main memory 150 (or writing to local cache in CPU 110 that is later made visible to main memory 150), and reading or loading values from main memory 150.

Figure 2A:
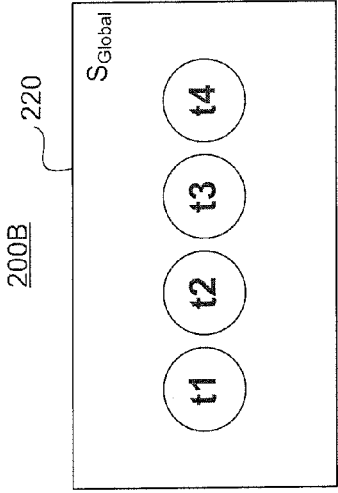
FIG. 2A illustrates a system that includes global memory and four threads in the context of the SC for DRF model.

FIG. 2A illustrates a system 200A that includes global memory 210 (which is substantially the same as main memory 150), and four threads t1, t2, t3, and t4, that are executed by CPU 110 according to the SC for DRF model. A SC for DRF model does not include synchronization mechanisms that allow threads to communicate with a subset of threads, called a scope, that may access a shared memory or a common ordering point, such as a level of cache in a memory hierarchy. Store events issued by any of the threads are written to global memory 210 (e.g., before they are read). System 200A may include caches.

Figure 2B:
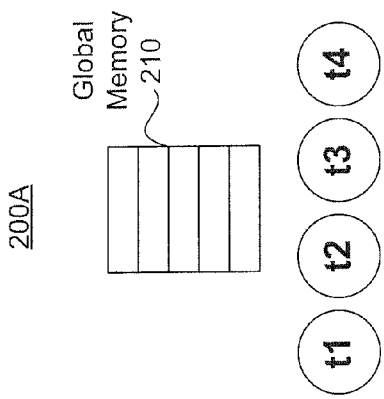
FIG. 2B illustrates a common global scope with four threads in the context of the SC for DRF model.

FIG. 2B illustrates a computing environment with only common global scope $S_{Global}$ 220, according to the SC for DRF model. Threads t1, t2, t3, and t4 are included in common global scope $S_{Global}$ 220. Synchronization events (e.g., release and acquire events) in a SC for DRF model have total global order, and may perform expensive local memory (or cache) flush/invalidate for acquire or release events. For example, whenever a thread performs a release event, data in caches are made globally visible to other threads, by flushing and invalidating dirty values (previous writes) from any cache to global memory 210, and performing the release synchronization event in global memory 210, which is relatively slow.

Figure 2C:
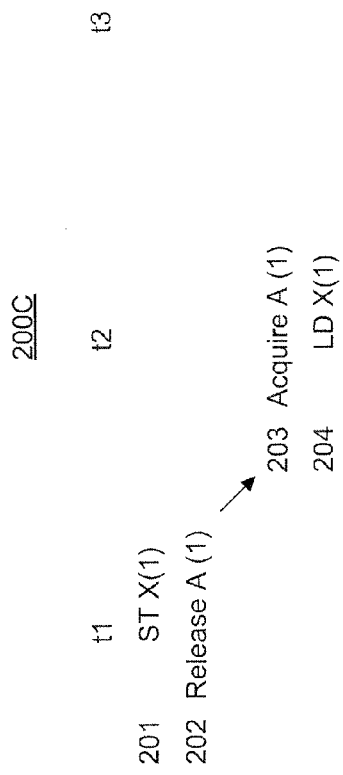
FIG. 2C illustrates a method in the context of the SC for DRF model.

FIG. 2C illustrates a method 200C, according to the SC for DRF model. In one example, systems 100 and 200A may be used to demonstrate method 200c. It is to be appreciated that operations in method 200C may be performed in a different order than shown, and method 200C may not include all operations shown. For ease of discussion, and without limitation, method 200C will be described in terms of elements shown in FIG. 1, FIG. 2A, and FIG. 2B.

In FIG. 2C, two instruction threads, t1 and t2, executed by CPU 110 are shown. Thread t1 has two steps, 201 and 202, and thread t2, includes steps 203 and 204.

At step 201, the memory event ST X(1) causes the value of "1" to be stored or written to an address X in local cache in CPU 110 (not shown).

At step 202, a release synchronization event causes the value written at address X to be flushed from local cache to global memory 210 where it is visible to all threads, t1-t4.

At step 203, an acquire synchronization event occurs with respect to global memory 210.

At step 204, the memory event LD X(1) causes the value of "1" to be loaded or read from address X in global memory 210.

A data race in SC for DRF is indicative of an error. A program contains a data race if in any possible sequentially consistent execution two conflicting data memory events appear next to each other in the total global order. In other words, a data race occurs when two conflicting data accesses occur at the same time. More specifically, a data race occurs if the following conditions are met: (a) two conflicting data accesses (e.g., store or load memory events) occur, (b) they are directed to the same address, (c) are on different threads, and (d) at least one event is a write, and the two conflicting data accesses are not separated by a synchronization event (e.g., release or acquire event).

The acquire and release synchronization events in SC for DRF method 200C have total global order. This is highly inefficient in systems such as a GPU as synchronizations require completion to global memory 210. Further, as other scopes are not defined, efficient local synchronizations are not possible.

If an application program were able to specify the scope of a synchronization operation, then the application program might be able to better use the available memories. For example if an operation running on t1 could indicate through its release synchronization event that only threads t1 (itself) and t2 will observe the synchronization, then an implementation could safely use a common memory point for communication, rather than having to complete to global memory 210.

Figure 3:
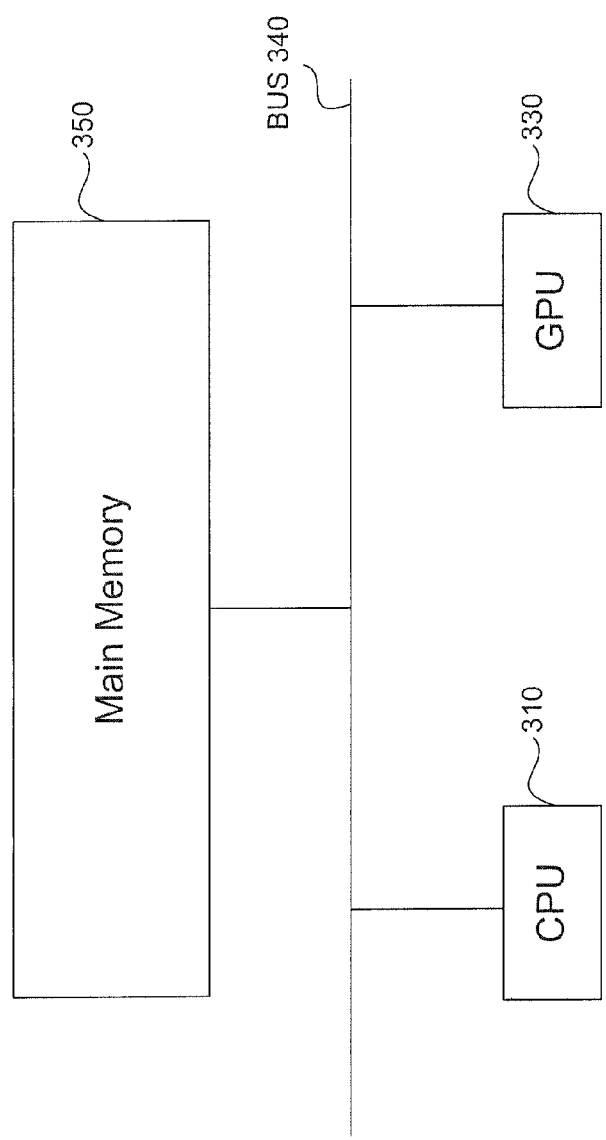
FIG. 3 illustrates a heterogeneous computing system, according to an embodiment.

FIG. 3 illustrates a heterogeneous computing system, according to an embodiment. In the example shown, system 300 is an APU environment that includes CPU 310, GPU 330, main memory 350, and bus 340. Bus 340 may be any type of communication infrastructure used in computer systems, including a peripheral component interface (PCI) bus, a memory bus, a PCI Express (PCIE) bus, front-side bus (FSB), hypertransport (HT), or another type of communication structure or communications channel whether presently available or developed in the future.

Figure 4:
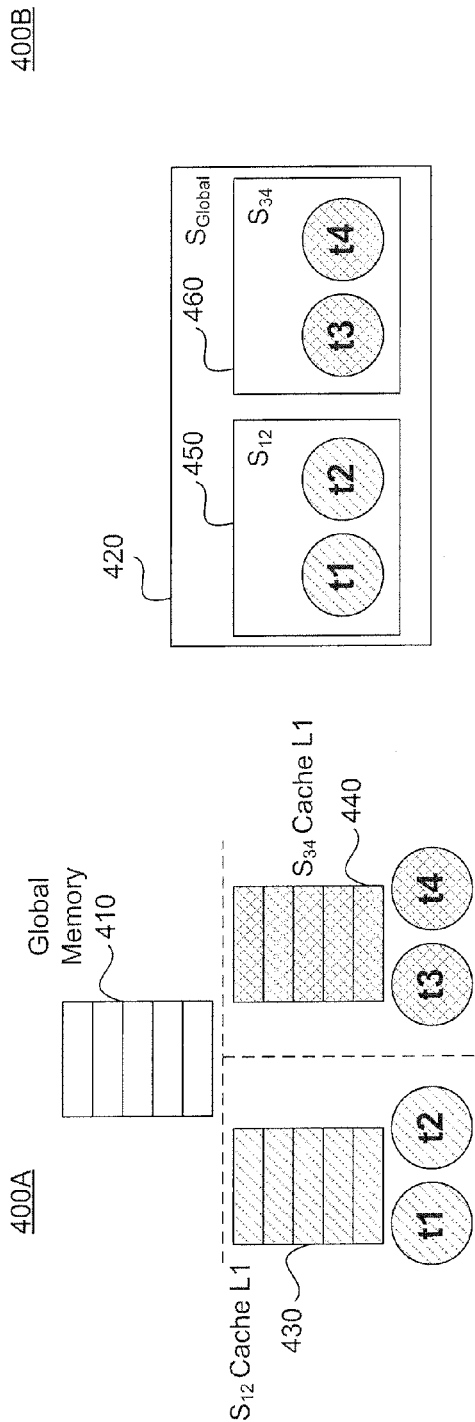
FIG. 4A illustrates a system that includes hierarchical memory of a heterogeneous computing environment with scopes, according to an embodiment.
FIG. 4B illustrates four threads with scopes as well as common global scope in a heterogeneous computing environment, according to an embodiment.
FIG. 4C illustrates a method demonstrating scope order, according to an embodiment.

FIG. 4A illustrates a system 400a that includes a hierarchical memory of a heterogeneous computing environment, according to an embodiment. System 400a includes global memory 410, local cache $S_{12}$ Cache L1 430, local cache $S_{34}$ Cache L1 440, and threads t1, t2, t3, and t4. Global memory 410 is substantially the same as main memory 350. Local caches, $S_{12}$ Cache L1 430 and $S_{34}$ Cache L1 440, may be part of a memory hierarchy of GPU 330 of FIG. 3. In system 400, threads t1 and t2 share local cache $S_{12}$ Cache L1 430, and threads t3 and t4 share local cache $S_{34}$ Cache L1 440. Values of local cache are eventually written to global memory 410.

In embodiments, synchronization events in a new class of memory consistency models called Sequential Consistency for Heterogeneous Race Free (SC for HRF) occur with respect to a subset of threads in an execution called a scope. Scopes can overlap with one another. In an SC for HRF model, threads belong to one or more scopes and synchronization is performed with respect to one of those scopes.

FIG. 4B illustrates four threads, t1, t2, t3, and t4, executed by GPU 330, local scopes, $S_{12}$ 450 and $S_{34}$ 460, as well as common global scope $S_{Global}$ 420 in a heterogeneous computing environment, according to an embodiment. A store memory event is complete when the data is written to a common ordering point such as local cache, and is visible to a group of threads that share access to that common ordering point. Local scope allows threads to synchronize to a scope $S_{12}$ 450 and scope $S_{34}$ 460 when possible, instead of having to synchronize to a common global scope $S_{Global}$ 420, and provides considerable savings with regards to limited bandwidth access to main memory, reduced latency, and power savings. In FIG. 4B, threads t1 and t2 belong to both scope $S_{12}$ 450 and common global scope $S_{Global}$ 420. Likewise, threads t3 and t4 belong to both scope $S_{34}$ 460 and common global scope $S_{Global}$ 420.

Programmers will have to decide which scope to use for synchronizing events. Generally, programmers will want to choose the smallest scope possible that includes the threads involved in a communication. Practically, scopes can be defined to reflect the capabilities of a system. In a GPGPU, there will likely be a scope for a group of threads sharing a memory in main memory 350 or local cache. More specifically, the choice of scope will depend on properties of a specific SC for HRF model that regulates how synchronization from different scopes can interact with one another.

Like the class of SC for DRF models, SC for HRF models allow programmers to reason in terms of sequential consistency as long as the programs they write are free of heterogeneous races. A heterogeneous data race occurs if one of the following occurs: (a) two conflicting memory operations are not separated by any synchronization event, the memory events are directed to the same address in main memory, and at least one is a store memory event (write); or (b) the synchronization events applied are performed with respect to insufficient scope. Sufficiency is determined by the specific SC for HRF model being used. For example, in an embodiment, insufficient scope can include a thread releasing to a global scope (all thread scope) and another thread acquiring from a narrow, non-global scope.

Embodiments include an optimizer that analyzes at least two threads of program code under a given SC for HRF memory model and determines correctness with regards to ordering of the events in the program code. SC for HRF memory models include a combination of three properties: scope order, scope inclusion, and scope transitivity.

A software program may be incorrect when applied under the conditions of one property, but correct when applied under the conditions of another property. Thus, embodiments include an optimizer that can analyze a portion of program code and indicate whether the synchronization events, for example, are sufficient.

There are two types of scope order properties in an SC for HRF model: strong scope order and weak scope order. A scope is a subset of common global scope $S_{Global}$ 220. Strong scope order is present when there is order among all release and acquire synchronization events in the system, regardless of their scope. Note that strong scope order is different than the total global order in SC for DRF, as strong scope order can include scopes that are a subset of threads in the system, whereas total global order pertains only to common global scope $S_{Global}$ 220, i.e., SC for DRF does not include other scopes.

Weak scope order is present when release synchronization events and acquire synchronization events in different scopes are not ordered with respect to each other. If two threads are in the same scope, weak scope order permits local synchronization events to coordinate (e.g., with a local barrier) within the scope with lower energy and performance overhead, rather than at common global scope. This is described further below.

FIG. 4C illustrates a method 400C demonstrating scope order, according to an embodiment. In one example, system 400A may be used to demonstrate method 400C. It is to be appreciated that operations in method 400C may be performed in a different order than shown, and method 400C may not include all operations shown. For ease of discussion, and without limitation, method 400C will be described in terms of elements shown in FIG. 4A and FIG. 4B.

To demonstrate a program analyzed by an optimizer respecting an SC for HRF model that supports the property of weak scope order, assume that in method 400C, neighboring threads, t1 and t2, communicate with each other in isolation. Thread t1, includes steps 401 and 402, and thread t2 includes steps 403 and 404, Threads t3 and t4 also communicate with each other in isolation. Thread t3 includes steps 405 and 406 and thread t4 includes steps 407 and 408.

For example, within scope $S_{12}$ 450, Release A is ordered to occur before Acquire A, so thread t1 executes Release A before thread t2 executes Acquire A. Likewise, within scope $S_{34}$, Release B is ordered to occur before Acquire B, so thread t3 executes Release B before thread t4 executes Acquire B. However, there is no ordering with respect to synchronization events with variable A and variable B, i.e., they are not ordered, so steps 401-404 may take place in parallel with steps 405-408 rather than in sequential order, thus, there is weak scope order in system 400.

At step 401, thread t1 writes the value of "1" to address X in $S_{12}$ Cache L1 430.

At step 402, a release synchronization event makes the write visible to threads in $S_{12}$ Cache L1 430.

At step 403, a acquire synchronization event occurs with respect to $S_{12}$ Cache L1 430.

At step 404, thread t2 reads the value of "1" from address X in local cache $S_{12}$ Cache L1 430 rather than having to wait for the write to be propagated to global memory 410.

Analogous steps take place in local cache $S_{34}$ Cache L1 440 as one skilled in the art would readily understand. As a write takes place in step 401 in $S_{12}$ Cache L1 430, threads t3 and t4 are not aware of the value written to address X, even after Acquire A, because threads t3 and t4 are not part of scope $S_{12}$ 450.

With different assumptions, FIG. 4C can also illustrate a method 400C demonstrating strong scope order, according to an embodiment. There is strong scope order in method 400C when the release and acquire synchronization events in a program are ordered with respect to each other regardless of their scope. To demonstrate strong scope order, we assume that in system 400A, the synchronization events of variable A are ordered to occur before those of variable B as follows: Release A, Acquire A, Release B, then Acquire B.

Since the synchronization events associated with variable A and the synchronization events associated with variable B are ordered, steps 401-404 take place before steps 405-408 in sequential order, thus, there is strong scope order in system 400. In another example of strong scope order, steps 404 and 405 can be reordered. In yet another example of strong scope order, assuming that step 403 occurs before step 406, then step 402 also occurs before step 406.

To demonstrate a program analyzed by an optimizer respecting an SC for HRF model that supports the property of scope inclusion, different but overlapping, scopes are used by at least two synchronizing threads and two conditions are satisfied: one scope is a subset of the other, and both scopes contain both synchronizing threads. Other definitions are also possible; a model could, for example, consider scope inclusion valid whenever one scope is a subset of the other regardless of whether or not both scopes contain both threads.

For programming, scope inclusion can be helpful when one side of a synchronization operation has more specific information about scope than the other. For example, consider a producer thread that produces a value consumed by all threads in the system. The producer releases to common global scope but not all consumers necessarily need to acquire from common global scope if they know they share a smaller scope with the producer thread. In that case, a consumer can avoid the full overheads of a global acquire.

From an implementation perspective, to support scope inclusion, acquire and release synchronization events are inclusive, e.g., the actions performed on release to common global scope is a superset of the actions performed on a release to any smaller scope that includes the releasing thread. The releasing thread is the thread that includes the release synchronization event. When memory is organized hierarchically and scopes are defined to reflect the hierarchy, scope inclusion is quite natural.

Figure 5:
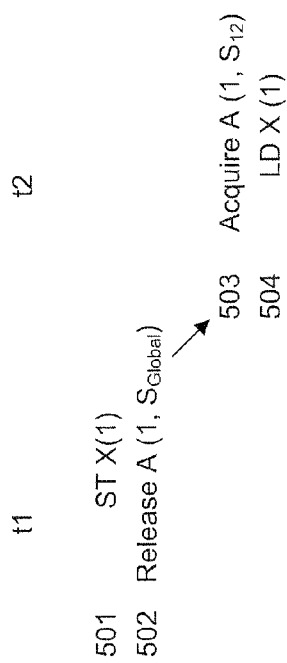
FIG. 5 illustrates a method demonstrating the property of scope inclusion, according to an embodiment.

FIG. 5 illustrates a method demonstrating the property of scope inclusion, according to an embodiment. In one example, system 400A may be used to demonstrate method 500. It is to be appreciated that operations in method 500 may be performed in a different order than shown, and method 500 may not include all operations shown. For ease of discussion, and without limitation, method 500 will be described in terms of the elements shown in FIG. 4A, and FIG. 4B.

Method 500, demonstrates a program analyzed by an optimizer respecting an SC for HRF model that supports the property of scope inclusion. The property of scope inclusion is respected when:
- different, but overlapping scopes, e.g., $S_{12}$ 450 and common global scope $S_{Global}$ 420, are used by synchronizing threads, e.g., t1 and t2;
- one scope, e.g., $S_{12}$ 450, is a subset of the other, e.g., common global scope $S_{Global}$ 420; and
- both overlapping scopes contain the synchronizing threads.

For example, thread t1 contains a release synchronization event and thread t2 contains a acquire synchronization event.

Thread t1 includes steps 501 and 502 and thread t2 includes steps 503 and 504.

At step 501, a store memory event writes a value of "1" to address "X" in local cache $S_{12}$ Cache L1 430.

At step 502, a release synchronization event is a global completion event and makes the write visible to all threads in common global scope $S_{Global}$ 420. Thus, the data written to local cache $S_{12}$ Cache L1 430 is written to global memory 410.

At step 503, an acquire synchronization event occurs with respect to scope $S_{12}$ 450.

At step 504, thread t2 reads the value of "1" from address X in local cache $S_{12}$ Cache L1 430 even though the write has been propagated to global memory 410. If, for example, thread t1 is a producer that releases data to common global scope $S_{Global}$ 420 but not all consumers (e.g., t2) necessarily need to acquire from common global scope $S_{Global}$ 420 if they know they share a smaller scope (e.g., $S_{12}$ 450) with the producer thread t1. Thus, consumer thread t2 can avoid the full overheads of a global acquire.

To demonstrate a program analyzed by an optimizer respecting an SC for HRF model that supports the property of scope transitivity, two threads can synchronize with each other indirectly through different scopes. From a programming perspective, scope transitivity can be helpful in applications with irregular parallelism where synchronization outside a local group is rare but possible.

To support scope transitivity, a release synchronization event in one thread makes not only the stores in the releasing thread visible in the releasing scope, but also ensure that any stores from another thread with which the releasing thread previously synchronized are made visible in the releasing scope. This is different from most well-known consistency models in which synchronization affects only the ordering of operations from the synchronizing thread. Implementing scope transitivity follows naturally from a hierarchical memory architecture.

If an SC for HRF model supports scope transitivity, before a release synchronization event completes, prior stores from the releasing thread and prior stores made visible to the releasing thread through a previous acquire complete to the releasing scope. Before an acquire completes, prior loads from the acquiring thread and prior loads made visible to the acquiring thread through a previous acquire, complete with respect to the acquiring scope.

Figure 6:
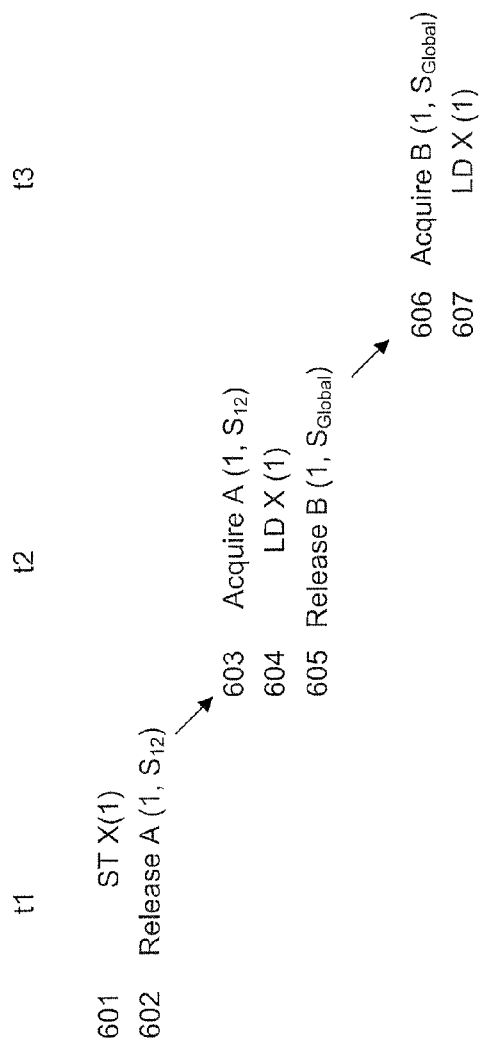
FIG. 6 illustrates a method demonstrating the property of scope transitivity, according to an embodiment.

FIG. 6 illustrates a method 600 demonstrating a program analyzed by an optimizer respecting an SC for HRF model that supports the property of scope transitivity, according to an embodiment. In one example, system 400a may be used to demonstrate method 600. It is to be appreciated that operations in method 600 may be performed in a different order than shown, and method 600 may not include all operations shown. For ease of discussion, and without limitation, method 600 will be described in terms of elements shown in FIG. 4A, and FIG. 4B.

Thread t1 includes steps 601 and 602, thread t2 includes steps 603-605, and thread t3 includes steps 606 and 607.

In method 600, due to scope transitivity, two threads, t1 and t3, synchronize indirectly through thread t2. Threads t1 and t2 synchronize before sharing the data contained at address X.

At step 601, a store memory event (write) by thread t1 causes a write to address "X" with a value "1" in $S_{12}$ Cache L1 430.

At step 602, the release synchronization event to variable A ensures the value "1" written to address X in $S_{12}$ Cache L1 430 is visible to threads in scope $S_{12}$ 450.

At step 603, thread t2 ensures other events are complete before thread t2 executes an acquire synchronization event to variable A.

At step 604, a load memory event (read) by thread t2 causes the value "1" to be read from address X in $S_{12}$ Cache L1 430.

At step 605, thread t2 issues a release to $S_{Global}$ 420 to variable B. Because releasing thread t2 previously synchronized with thread t1, thread t2 makes the store memory event (write) from step 601 in $S_{12}$ Cache L1 430 by thread t1, visible to global memory 410. In other words, before a Release to variable B completes, prior stores from the releasing thread t2 (none in the example), and prior stores (e.g., ST X(1) at step 601) are made visible to the releasing thread t2 through a previous acquire (e.g., Acquire A at step 603) complete to the target scope, $S_{Global}$ 420.

At step 606, thread t3 ensures other events are complete before t3 executes an acquire synchronization event to variable B.

At step 607, thread t3 reads the value of "1" from the address X in global memory 410. Without scope transitivity, the load value of X at step 607 would not read the value written at step 601.

Embodiments include an optimizer that can analyze a portion of multi-threaded program code assuming various combinations of the parameters: scope order, scope inclusion, and scope transitivity, and determine a set of optimizations, typically involving instruction reordering, that result in correct behavior. For example, if an optimizer is a compiler, the output can be a transformation of the input program (e.g., transformation of source code to intermediate code). If the optimizer is a finalizer, the output can be a transformation of the intermediate code to machine code or assembly language. If the optimizer is a GPU or a CPU, the output of the optimizer can be an execution of the input program.

Figure 7:
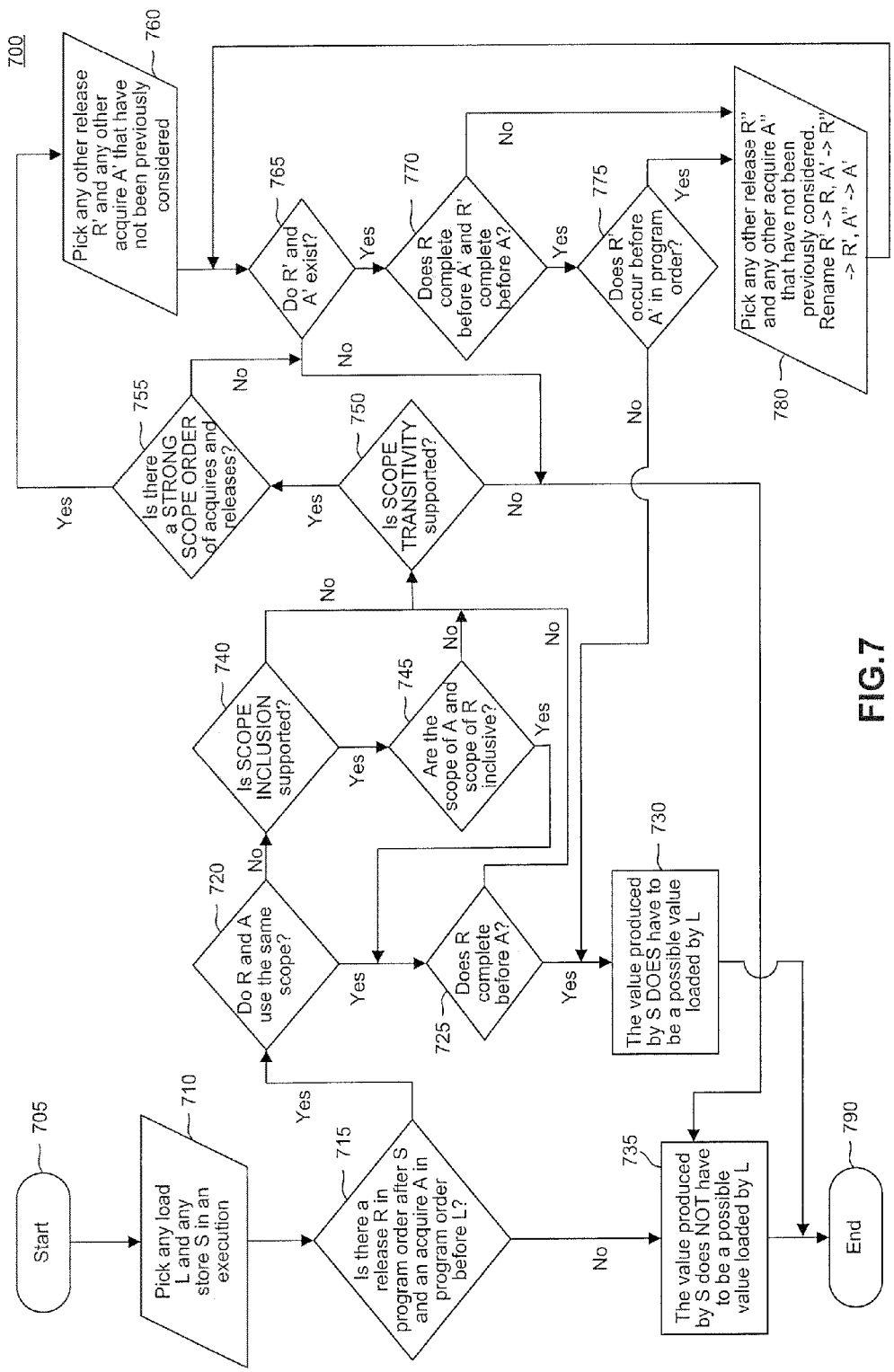
FIG. 7 illustrates the operation of an optimizer, according to an embodiment.

FIG. 7 illustrates the operation of an optimizer, according to an embodiment. In one example, method 600 may be used to demonstrate method 700. It is to be appreciated that operations in method 700 may be performed in a different order than shown, and method 700 may not include all operations shown. For ease of discussion, and without limitation, method 700 will be described in terms of elements shown in FIG. 4A, FIG. 4B, and FIG. 6.

In method 600, assume that the initial values for address X are set with value "0" and the programmer intends for the value read at step 607 to be the value written at step 601. The program is analyzed by an optimizer respecting an SC for HRF model that supports the properties of scope transitivity and strong scope order.

The optimizer is used to analyze the program code (method 600) and indicate whether the memory event in step 601 should be ordered before the memory event in step 607 given that Release A at step 602 occurs before Acquire A in step 603. When the optimizer reaches step 730 in method 700, the optimizer determines that the store memory event in step 601 has to occur before Acquire A in step 603, and the steps 601 and 603 cannot be reordered in a program where Release A in step 602 occurs before Acquire A in step 603. When the optimizer reaches step 735 of method 700, the program contains a race and the optimizer does not have to ensure that the load at step 607 sees the value at step 601. For example, the value read at step 607 is the initial value "0" and is not what the programmer intended. Thus, the instructions being analyzed could be correctly reordered to produce the result the programmer intended.

While method 600 is a simple example, a person skilled in the art would be able to understand how the optimizer can be extended for more complex cases, for example, when another store memory event occurs in thread t2. In embodiments, the optimizer analyzes a portion of program code of method 600 of FIG. 6 and exhaustively considers the various event pairs in the program to determine if reordering is possible.

Method 700 begins at step 705 and proceeds to step 710. At step 710, the optimizer will choose, for example, the store memory event in step 601 in thread t1 of method 600 and the load memory event in step 607 in thread t3 of method 600.

At step 715, the optimizer determines whether there is a release synchronization event in program order (method 600) after the store memory event in step 601, and an acquire synchronization event in program order before the load memory event of step 607. Based on method 600, the answer is yes, there is a Release A event at step 602 and an Acquire B event at step 606, and method 700 proceeds to step 720.

If the answer is no for a load L and store S, method 700 proceeds to step 735 that determines that the instructions being analyzed could be correctly reordered.

At step 720, if the optimizer determines that the release synchronization event R (Release A of step 602) and the acquire synchronization event A (Acquire B of step 606) do not have the same scope, method 700 proceeds to step 740.

For example, Release A of step 602 releases to scope $S_{12}$ 450 and Acquire B of step 606 releases to $S_{Global}$ 420, thus their do not have the same scope.

If the scopes were the same at step 720, method 700 proceeds to step 725.

At step 740, scope inclusion is determined. While scope $S_{12}$ 450 is a subset of common global scope $S_{Global}$ 420, thread t1 that includes Release A and thread t3 that includes the Acquire B do not belong to the same scopes: Release A belongs to scope $S_{12}$ 450 and common global scope $S_{Global}$ 420 while Acquire B belongs to scope $S_{34}$ 460 and common global scope $S_{Global}$ 420, thus, the second condition of scope inclusion is not met. Method 700 proceeds to step 750.

If scope inclusion was supported, method 700 proceeds to step 745.

At step 750, the optimizer determines whether scope transitivity is supported. As scope transitivity is one of the given conditions, method 700 proceeds to step 755.

If scope transitivity is not supported, the method 700 proceeds to step 735; the instructions under analysis can be reordered.

At step 755, the optimizer determines whether the program respects strong scope order, another given condition, and method 700 proceeds to step 760.

If strong scope order does not exist, method 700 proceeds to step 735, again indicating a problem exists with the program code.

At step 760, the optimizer considers other release synchronization event (R') and acquire synchronization event (A') in the program code not previously considered.

At step 765, the optimizer finds Acquire A' (Acquire A at step 603) and Release R' (Release B at step 605) and method 700 proceeds to step 770.

If no other release and acquire events are found at step 765, method 700 proceeds to step 735 indicating the instructions under analysis can be reordered.

At step 770, a determination is made whether R (Release A of step 602) completes before A' (Acquire A of step 603), and whether R' (Release B of step 605) completes before A (Acquire B of step 606). Based on method 600, the answer is yes and method 700 proceeds to step 775.

If the answer is no at step 770, there is not sufficient scope and another synchronization event pair likely exists; method 700 proceeds to step 780.

At step 775, the optimizer determines whether R' (Release B of step 605) occurs before A' (Acquire A of step 603). According to the program code, the answer is no and method 700 proceeds to step 730 indicating the instructions under analysis cannot be reordered.

If the answer is yes at step 775, then another release and acquire synchronization event pair likely exists. Thus method 700 proceeds to step 780 to reiterate the process of identifying the pairs and confirming their proper order.

At step 730, the optimizer confirms that the value written at step 601 will be read at step 607 in a program where Release A at step 602 occurs before Acquire A at step 603 and Release B at step 605 occurs before Acquire B at step 606. Thus, a programmer is aware that reordering of events is not necessary or allowed. Likewise, if a result of the optimizer violates the programmer's intention, the programmer may reorder events or add additional synchronization events to correct the problem.

The three properties of an HRF model: scope ordering, scope inclusion, and scope transitivity are further defined according to set builder notation, in terms of an order (i.e., a relation) that each property contributes to an overall HRF model allowing model designers to pick and choose freely.

Corresponding FIG. 8, FIG. 9, and FIG. 10 summarize the notations for scope ordering, scope inclusion, and scope transitivity, respectively.

A brief introduction regarding the terminology is followed by descriptions of the three properties of an HRF model:

$$\{x / x \in \pi \land x > 0 \land x < 5\}$$

The notation is read as "all x such that x is in the set of integers and x is greater than 0 and x is less than 5". The notation is equivalent to the set $\{1,2,3,4\}$. A binary relation on a set defines an ordering between pairs of elements in the set. For example, given a set of all airports in the US, a relation direct (D) is defined that contains all pairs of airports for which there is a direct flight from one to the other. The relation can be expressed as: {(Boston, Seattle), (Seattle, Boston), (Houston, Seattle), (Seattle, Houston), . . . } assuming that there are direct flights in both directions between Boston and Seattle and Houston and Seattle, respectively.

Note that the relation does not answer the question: "can one go from airport X to airport Y?" because the relation does not include the possibility of a connection. To build the relation connected (C) that would answer this questions, we can take the transitive irreflexive closure of direct, symbolized as $C=D^+$. A transitive irreflexive closure of relation R is the minimal transitive relation that includes R (i.e., take R and add all pairs that can be reached through transitivity). Irreflexive simply means that the identical pairs, e.g., (Boston, Boston) are not included, in the closure. The transitive irreflexive closure of D as specified above would be {(Boston, Seattle), (Seattle, Boston), (Houston, Seattle), (Seattle, Houston), (Boston, Houston), (Houston, Boston), . . . }. Also, (Boston, Houston) is added because there is a transitive sequence in D: (Boston, Seattle) (Seattle, Houston). Likewise for (Houston, Boston).

Scope ordering is a property used to define a fence order, $\overline{fo}$, that describes the order of memory synchronization events such as acquire synchronization events and release synchronization events; a fence order does not define ordering among memory data events such as load memory events and store memory events.

Scope inclusion is a property used to define a synchronization order, $\overline{so}$, that defines which pairs in $\overline{fo}$ are used to enforce synchronization order. Thus, $\overline{so}$ is a subset of $\overline{fo}$.

Scope transitivity is a property used to define an order heterogeneous-happens-before ($\overline{hhb}$) that contains all pairs of operations in an execution that have a well-defined ordering under the model. An optimizer/programmer can use $\overline{hhb}$ to determine if there is a race (i.e., a conflicting load memory event or store memory event is not in $\overline{hhb}$), and then reason about the memory order (e.g., sequential consistency).

FIG. 8 illustrates a set builder notation for a model with the properties of strong and weak scope order, according to an embodiment. Scope ordering, defines how synchronization events (e.g., fences) are ordered with respect to each other. Two variations of scope order are strong scope order and weak scope order with respect to a scope. When a program supports weak scope order, fences from different scopes are unordered and there is no certainty as to whether a synchronization event in a first scope happens before another synchronization event in a second scope. When a program supports strong scope order, the fences in a program are ordered with respect to each other regardless of scope, even though they threads may not interact with each other through loads and stores in value order (see below). For example, in a model that supports strong scope order, a synchronization thread in the first scope and a synchronization thread in the second scope are ordered with respect to each other and with respect to threads in other scopes.

A synchronizing store event, $S_s$, is a store operation that cannot be reordered with respect to acquires and releases (e.g., if a synchronization store occurs after a release in program order, the synchronization store also appears after the release in any order observed by any other processor). Synchronizing stores may occur as part of special instructions such as a store-release, which is the combination of a release and synchronizing store bundled into one instruction.

When an optimizer analyzes a program, the order of a release-acquire pair can be determined by considering their relation to other loads and synchronizing stores in program order. Note that a release-acquire order cannot be directly observed because they do not produce values.

Intuitively, a release R occurs before an acquire A if there is a synchronizing store $S_s$ after R in program order that produces a value for a load L before A in program order. In other words, through values, an optimizer can determine that a synchronizing store $S_s$ occurs before a load L. Then, by analyzing releases (e.g., a later synchronizing store $S_s$ in program order cannot occur before an earlier release) and acquires (e.g., an earlier load in program order cannot occur after a later acquire), whether or not a release R occurred before an acquire A can be inferred.

The concept is made explicit in the notation below. $\overline{vo}$ is the value order created by loads and stores in an execution; a synchronizing store $s_i$ from thread i and load $l_j$ from thread j appear in $\overline{vo}$ if and only if $l_j$ receives the value synchronizing store $s_i$ produced. From there we can build the inferred order ($\overline{io}$) of releases and acquires as described above. A release $r_i$ appears before an acquire $a_j$ in inferred order if and only if there exists (∃) a synchronizing store $s_i$ and load $l_j$ such that $r_i$ occurs before synchronizing store $s_i$ in program order (literally in the equation: pair ($r_o s_i$) is an element of the relation "program order"), $l_j$ occurs before $a_j$ in program order, and $s_i$ occurs before $l_j$ in value order.

The inferred order may be incomplete (e.g., some acquire/release synchronization pairs do not appear in $\overline{io}$ if there is no load memory event or store memory event to order them). Thus, the inferred order is refined according to the specific model by pairing the inferred order with knowledge of program order.

When a model supports a strong scope order, the order of acquire synchronization events and release synchronization events can be determined on two threads that interact (e.g., appear together in value order). To determine the order, an optimizer performs a transitive irreflexive closure of the union of inferred order and the program order of the acquire/release synchronization operations ($\overline{pof}$) (i.e., normal loads and stores are excluded so they do not appear in $\overline{fo}$).

When a model supports a weak scope order, release synchronization events and acquire synchronization events are only ordered within their own scope. Care is taken not to assign an order to any release-acquire synchronization pair where the operations use different scopes. Weak scope order is different from strong scope order in two ways. First, an acquire/release synchronization is added to inferred order if both have identical scope. Second, when $\overline{fo}$ is formed, only a fence program order for a single scope at a time is considered. An optimizer performs the union of the transitive irreflexive closures over the scopes (i.e., there is no transitive irreflexive relation between two different scopes). The resulting $\overline{fo}$ is a weak scope order; any release/acquire synchronization using different scopes will not appear together in $\overline{fo}$.

Both definitions use the same concept of value order:

$\overline{vo} = \{(s_i, l_j) | l_j \text{ receives the value of } s_i \text{ during an execution}\}$ In the end, $\overline{fo}$ indicates the order of release/acquire synchronization events in an execution, but does not indicate if these fences cause synchronization because, for example, the release/acquire synchronization events may not be in the same scope.

FIG. 9 illustrates a set builder notation for a model with and without scope inclusion, according to an embodiment. Scope inclusion is used to determine whether or not threads are synchronized when they use different scopes, and when one scope is inclusive of the other by defining a synchronization order, $\overline{so}$. Synchronization order refines a fence order $\overline{fo}$ according to the specific model.

When scope inclusion is supported, an optimizer analyzes the release/acquire synchronization pairs in the $\overline{fo}$ that use the same scope (see the variable same in FIG. 9), where the scope of the release synchronization includes the scope of the acquire synchronization (see the variable inclra in FIG. 9), and where the scope of the acquire synchronization includes the scope of the release synchronization (see the variable inclar in FIG. 9). In the inclusive cases, both scopes are ensured to include both participating threads by omitting cases where that is not true from inclra and inclar. For example, the variable inclar in FIG. 9 reads "and thread j is in the scope used by $r_i$ on thread i".

When scope inclusion is not supported, only release/acquire synchronization pairs in $\overline{fo}$ that use the same scope are considered.

FIG. 10. Illustrates a set builder notation for a model with and without scope transitivity, according to an embodiment. Scope transitivity determines whether or not threads are synchronized if they use synchronization events that not paired through scope inclusion but a transitive connection is made between two other synchronization operations that support scope inclusion with the original synchronization events.

When scope transitivity is supported, a heterogeneous-happens-before ($\overline{hhb}$) relation is defined as the transitive irreflexive closure of program order and synchronization order.

When scope transitivity is not supported, all-encompassing transitive irreflexive closure cannot be used. Rather, a scope is considered separately. For a scope, an optimizer analyzes release/acquire synchronization pairs in synchronization in a scope, and the transitive irreflexive closure of that partition of synchronization order is considered because scope transitivity is respected relative to a single scope, as in an SC for DRF model. The set of events are ordered by the scope in question. Then, the union of all of those closures (i.e., the combined ordering contributions from each scope) provides the complete heterogeneous-happens-before relation.

Various aspects of the disclosure can be implemented by software, firmware, hardware, or a combination thereof. FIG. 11 illustrates an example computer system 1100 in which some embodiments, or portions thereof, can be implemented as computer-readable code. For example, the methods 400-700, of FIGS. 4(c)-7 can be implemented in system 1100. Various embodiments are described in terms of the example computer system 1100. After reading this description, it will become apparent to a person skilled in the relevant art how to implement the embodiments using other computer systems and/or computer architectures.

Computer system 1100 includes one or more processors, such as processor 1104. Processor 1104 can be a special purpose or a general purpose processor. Examples of processor 1104 are CPU 310 and GPU 330 of FIG. 3, or a GPGPU, or APU as described earlier. Processor 1104 is connected to a communication infrastructure 1106 (for example, a bus or network) such as bus 340 of FIG. 3.

Computer system 1100 also includes a main memory 1108, such as random access memory (RAM) such as main memory 350 of FIG. 3, and may also include a secondary memory 1110. Secondary memory 1110 may include, for example, a hard disk drive 1112, a removable storage drive 1114, and/or a memory stick. Removable storage drive 1114 may comprise a floppy disk drive, a magnetic tape drive, an optical disk drive, a flash memory, or the like. The removable storage drive 1114 reads from and/or writes to a removable storage unit 1118 in a well-known manner. Removable storage unit 1118 may comprise a floppy disk, magnetic tape, optical disk, etc. that is read by and written to by removable storage drive 1114. As will be appreciated by persons skilled in the relevant art(s), removable storage unit 1118 includes a computer usable storage medium having stored therein computer software and/or data.

In alternative implementations, secondary memory 1110 may include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, and other removable storage units 1122 and interfaces 1120 that allow software and data to be transferred from the removable storage unit 1122 to computer system 1100.

Computer system 1100 may also include a communications interface 1124. Communications interface 1124 allows software and data to be transferred between computer system 1100 and external devices. Communications interface 1124 may include a modem, a network interface (such as an Ethernet card), a communications port, a PCMCIA slot and card, or the like. Software and data transferred via communications interface 1124 are in the form of signals that may be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1118, removable storage unit 1122, and a hard disk installed in hard disk drive 1112. Signals carried over communications path 1126 can also embody the logic described herein. Computer program medium and computer usable medium can also refer to memories, such as main memory 1108 and secondary memory 1110, which can be memory semiconductors (e.g. DRAMs, etc.). These computer program products are means for providing software to computer system 1100.

Computer programs (also called computer control logic) are stored in main memory 1108 and/or secondary memory 1110. Computer programs may also be received via communications interface 1124. Such computer programs, when executed, enable computer system 1100 to implement the embodiments as discussed herein. In particular, the computer programs, when executed, enable processor 1104 to implement the disclosed processes, such as the steps in the methods of FIG. 4C-FIG. 7 as discussed above. Accordingly, such computer programs represent controllers of the computer system 1100. Where the embodiments are implemented using software, the software may be stored in a computer program product and loaded into computer system 1100 using removable storage drive 1114, interface 1120, hard disk drive 1112 or communications interface 1127. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any computer useable medium. Such software, when executed in one or more data processing device, causes a data processing device(s) to operate as described herein. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). Embodiments may also be implemented as instructions stored on a non-transitory computer-readable medium, which may be read and executed by one or more processing units. Execution of these instructions by the one or more processing units would cause the processing unit(s) to perform any of the methods described in this specification. For example, execution of these instructions by the one or more processing units would cause the processing unit(s) to perform the methods illustrated, for example, in FIGS. 2C, 4C, 5 and 6.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method comprising:
   receiving a portion of program code, the portion having a first thread and a second thread;
   identifying a store memory event associated with the first thread and a load memory event associated with the second thread, wherein the store memory event and the load memory share a same variable; and
   determining, in accordance with a memory consistency model, when a program is heterogeneous-race-free due to a release synchronization event associated with the first thread and an acquire synchronization event associated with the second thread, the memory consistency model having a property of scope order, scope inclusion, scope transitivity or combination thereof, wherein the determining in accordance with the memory consistency model includes determining a correctness with regard to an ordering in program code of the release synchronization event and the acquire synchronization event and wherein the properties of the scope order, scope inclusion, and scope transitivity are defined based upon a capability of a system on which program code is being executed.

2. The method of claim 1, wherein the scope order comprises a strong scope order or a weak scope order.

3. The method of claim 1, wherein the scope order is a weak scope order, and the release synchronization event and the acquire synchronization event share a same scope.

4. The method of claim 1, wherein the scope order is a strong scope order, and both scope inclusion and scope transitivity are present in the memory consistency model.

5. The method of claim 1, wherein the scope order is a strong scope order, and scope transitivity is present in the memory consistency model.

6. The method of claim 1, wherein the scope order is a weak scope order, and scope transitivity is present in the memory consistency model.

7. The method of claim 1, wherein the scope order is a strong scope order, and scope inclusion is present in the memory consistency model.

8. A non-transitory computer-readable storage device having stored thereon instructions, execution of which, by a processing unit, cause the processing unit to perform operations comprising:
   receiving a portion of program code, the portion having a first thread and a second thread;
   identifying a store memory event associated with the first thread and a load memory event associated with the second thread, wherein the store memory event and the load memory share a same variable; and
   determining, in accordance with a memory consistency model, when a program is heterogeneous-race-free due to a release synchronization event associated with the first thread and an acquire synchronization event associated with the second thread, the memory consistency model having a property of scope order, scope inclusion, scope transitivity or combination thereof, wherein the determining in accordance with the memory consistency model includes determining a correctness with regard to an ordering in program code of the release synchronization event and the acquire synchronization event and wherein the properties of the scope order, scope inclusion, and scope transitivity are defined based upon a capability of a system on which program code is being executed.

9. The non-transitory computer-readable storage device of claim 8, wherein the scope order comprises a strong scope order or a weak scope order.

10. The non-transitory computer-readable storage device of claim 8, wherein the scope order is a weak scope order, and the release synchronization event and the acquire synchronization event share a same scope.

11. The non-transitory computer-readable storage device of claim 8, wherein the scope order is a strong scope order, and both scope inclusion and scope transitivity are present in the memory consistency model.

12. The non-transitory computer-readable storage device of claim 8, wherein the scope order is a strong scope order and scope transitivity is present in the memory consistency model.

13. The non-transitory computer-readable storage device of claim 8, wherein the scope order is a weak scope order and scope transitivity is present in the memory consistency model.

14. The non-transitory computer-readable storage device of claim 8, wherein the scope order is a strong scope order and scope inclusion is present in the memory consistency model.

15. A processing unit comprising one or more compute units configured to:
   receive a portion of program code, the portion having a first thread and a second thread;
   identify a store memory event associated with the first thread and a load memory event associated with the second thread, wherein the store memory event and the load memory share a same variable; and
   determine, in accordance with a memory consistency model, when a program is heterogeneous-race-free due to a release synchronization event associated with the first thread and an acquire synchronization event associated with the second thread, the memory consistency model having a property of scope order, scope inclusion, scope transitivity or combination thereof, wherein the determination in accordance with the memory consistency model includes the one or more compute units configured to determine a correctness with regard to an ordering in program code of the release synchronization event and the acquire synchronization event and wherein the properties of the scope order, scope inclusion, scope transitivity are defined based upon a capability of a system on which program code is being executed.

16. The processing unit of claim 15, wherein the scope order comprises a strong scope order or a weak scope order.

17. The processing unit of claim 16, wherein the scope order is a strong scope order, and both scope inclusion and scope transitivity are present in the memory consistency model.

18. The processing unit of claim 16, wherein the scope order is a strong scope order and scope transitivity is present in the memory consistency model.

19. The processing unit of claim 16, wherein the scope order is a weak scope order and scope transitivity is present in the memory consistency model.

20. The processing unit of claim 15, wherein the scope order is a weak scope order, and the release synchronization event and the acquire synchronization event share a same scope.

* * * * *